US 7,027,919 B2

United States Patent
Bernesi et al.

(10) Patent No.: US 7,027,919 B2
(45) Date of Patent: Apr. 11, 2006

(54) VEHICLE AND/OR ASSET TRACKING AND LOCALIZATION SYSTEM AND METHOD

(76) Inventors: Daniel Bernesi, 3080 Brabant-Marineau, Saint-Laurent, Quebec (CA) H4S 1K7; Francesco Losito, 193 François-Brunet, Lachenaie, Quebec (CA) J6V 1R1

( * ) Notice: Subject to any disclaimer, the term of this patent is extended or adjusted under 35 U.S.C. 154(b) by 8 days.

(21) Appl. No.: 10/698,547

(22) Filed: Nov. 3, 2003

(65) Prior Publication Data

US 2004/0093159 A1    May 13, 2004

Related U.S. Application Data

(60) Provisional application No. 60/422,889, filed on Nov. 1, 2002.

(51) Int. Cl.
*G01C 21/00* (2006.01)
*B60L 3/04* (2006.01)

(52) U.S. Cl. ............ 701/220; 701/207; 307/9.1; 307/10.4; 340/425.5; 340/426.11; 340/426.1

(58) Field of Classification Search ............ 701/200, 701/214, 220, 207; 340/998, 989, 991, 425.5, 340/426.1, 426.11; 342/357.09, 357.1; 307/9.1, 307/10.2–10.4
See application file for complete search history.

(56) References Cited

U.S. PATENT DOCUMENTS

| 5,225,842 A | 7/1993 | Brown et al. ............... 342/357 |
| 5,686,765 A | 11/1997 | Washington ............... 307/10.5 |
| 5,742,509 A * | 4/1998 | Goldberg et al. ........... 701/211 |
| 5,895,436 A | 4/1999 | Savoie et al. ............. 701/214 |

* cited by examiner

*Primary Examiner*—Yonel Beaulieu
(74) *Attorney, Agent, or Firm*—ROBIC; Gonzalo Lavin

(57) ABSTRACT

A tracking system and method for locating a vehicle and/or asset. The system includes an inertial navigation device with inertial navigation sensors mounted on the vehicle and/or asset for generating a position vector used to determine an absolute vehicle/asset location. The system also includes a radio transmitter connected to the navigation device for transmitting the position vector; and a central monitoring station for receiving the position vector transmitted by the radio transmitter.

10 Claims, 3 Drawing Sheets

VEHICLE AND/OR ASSET TRACKING AND LOCALIZATION SYSTEM AND METHOD

This application claims the benefit of Provisional Appliocation No. 60/422,889, filed Nov. 1, 2002

FIELD OF THE INVENTION

The present invention relates to a vehicle and/or asset tracking and localization system and method for determining absolute vehicle/asset location.

BACKGROUND OF THE INVENTION

Various systems have been suggested to date to enable the locating and tracking of stolen or missing vehicles. For example, U.S. Pat. No. 5,895,436 (SAVOIE) discloses a vehicle tracking system using the existing cellular network, whereas U.S. Pat. No. 5,225,842 (BROWN) discloses a vehicle tracking system employing global positioning system (GPS) satellites for position/location determination.

However, such prior art tracking systems are very dependent upon third party infrastructures to determine location information, which is disadvantageous for many reasons.

For example, tracking systems that use the cellular network are limited by constraints such as having to locate the missing vehicle through relative signal strength methods between cellular base stations. These systems also require several back and forth signalling transmissions between the location transceiver mounted in the vehicle and the base stations of the cellular network. One disadvantage of such tracking systems is that the cell distribution is not the same throughout the network and the accuracy of the tracking may vary depending on the number of base stations available at any site.

In the case of GPS tracking systems, the signals that are used are even weaker than in cellular networks requiring antennas with a clear view to the sky, also GPS does not work indoors.

There is therefore a need for a vehicle and/or asset tracking tracking system that is not dependent on the infrastructure of the existing wireless systems to obtain the location information of a missing vehicle or asset.

Furthermore, in this same field of vehicle security, it is known to use wireless remote cut-off modules to disable critical components in a vehicle such as fuel pumps, ignition, starter, fuel injection, etc., to prevent engine starting by unauthorized users.

The main disadvantage of present cut-off modules is the fact that since they must be wired to the main control unit, the wiring is easy to follow. Therefore they can be located and bypassed with little effort.

SUMMARY OF THE INVENTION

According to the present invention, there is provided a tracking system for locating a vehicle and/or asset comprising:
   an inertial navigation device including inertial navigation sensors mounted on the vehicle and/or asset for generating a position vector used to determine an absolute vehicle and/or asset location;
   a radio transmitter connected to the navigation device for transmitting the position vector; and
   a central monitoring station for receiving the position vector transmitted by the radio transmitter.

The radio transmitter may be any type of wireless transmitter using cellular networks, paging networks, or any other wireless radio transmission.

This system according to the present invention relies upon the typical characteristic of inertial sensors, which is the fact that a vehicle/asset's position or location is the result of the original location plus the second integral of the longitudinal and lateral acceleration magnitudes.

The system according to the present invention is therefore autonomous and self-contained, and does not depend upon third party infrastructures such as prior art vehicle tracking systems using cellular networks as disclosed in U.S. Pat. No. 5,895,436 (SAVOIE) or vehicle tracking systems employing global positioning system (GPS) satellites for position/ location determination as disclosed in U.S. Pat. No. 5,225, 842 (BROWN).

The preferred inertial sensors consist of micro-machined accelerometers manufactured using nano-technology methods, although other inertial sensors could be used.

Preferably, the inertial sensors combined with the central station data processing capabilities provide location resolutions approaching 1–2 meters per kilometer.

Absolute vehicle location may be displayed in Latitude-Longitude coordinates and/or scrolling area maps.

According to another aspect of the present invention, there is provided a method for locating a vehicle and/or asset comprising the steps of:
   a) mounting an inertial navigation device including inertial navigation sensors on the vehicle and/or asset, the inertial navigation device generating a position vector used to determine an absolute vehicle and/or asset location;
   b) transmitting the position vector by means of a radio transmitter connected to the navigation device; and
   c) receiving the position vector transmitted by the radio transmitter at a central monitoring station.

According to yet another aspect of the present invention, there is provided a method to control remote cut-off modules using a high frequency carrier superimposed to the existing vehicle wiring. The cut-off modules are connected directly to the controlled component, and controlled by superimposing a high frequency carrier signal to the 12 Volt vehicle wiring.

Preferably, this carrier may have a frequency between 50 kHz and 500 kHz, and is modulated by a coded signal that is used to remotely enable or disable the cut-off module.

Since there is no wiring from the main control to the cut-off modules, it becomes very difficult to locate and disable them.

The cut-off modules may be easily disguised within the existing vehicle wiring harnesses.

Preferably, the control signal contains digital packets that may address each module individually, the modules answer with status and acknowledge packets using the same communications principle.

Preferably, the remote cut-off modules contain a high frequency receiver/demodulator that extracts the data packet from the vehicle wiring, a rolling code data recovery circuit and a relay that is used to control, disable and enable the critical vehicle components.

Preferably, the modules are always in the disable mode unless enabled by the main control unit. Therefore removing or destroying the main control unit will not allow the vehicle's engine to be started.

Preferably, the packets contain a progressive rolling code key to address the remote modules. This means that every time that a module is addressed, an algorithm within the control module firmware generates a new, different identification code.

This process prevents would be thieves to eavesdrop the communication between the control and remote modules, and to try to energize the modules by emulating the control signals.

The use of rolling code technology to address the remote modules therefore prevents eavesdropping and the emulation of system control packets.

The invention as well as its numerous advantages will be better understood by reading of the following non-restrictive description of preferred embodiments made in reference to the appending drawing.

DETAILED DESCRIPTION OF THE INVENTION

Figure 1:
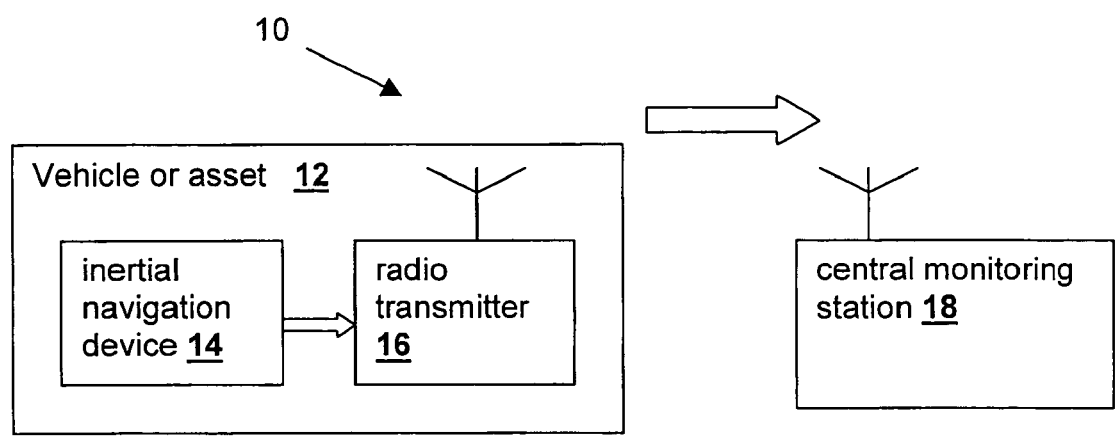
FIG. 1 is a schematic block diagram of a tracking system for locating a vehicle and/or asset according to a preferred embodiment of the present invention.

Referring to FIG. 1, the tracking system 10 for locating a vehicle and/or asset 12 according to a preferred embodiment of the present invention includes an inertial navigation device 14 with inertial navigation sensors mounted on the vehicle and/or asset 12 for generating a position vector used to determine an absolute vehicle/asset location. The system 10 also includes a radio transmitter 16 connected to the navigation device 14 for transmitting the position vector; and a central monitoring station 18 for receiving the position vector transmitted by the radio transmitter 16.

The radio transmitter 16 may be any type of wireless transmitter using cellular networks, paging networks, or any other wireless radio transmission.

The tracking system 10 according to the present may also include a mobile Tracker/Follower Vehicle, which is detailed further below.

Figure 2:
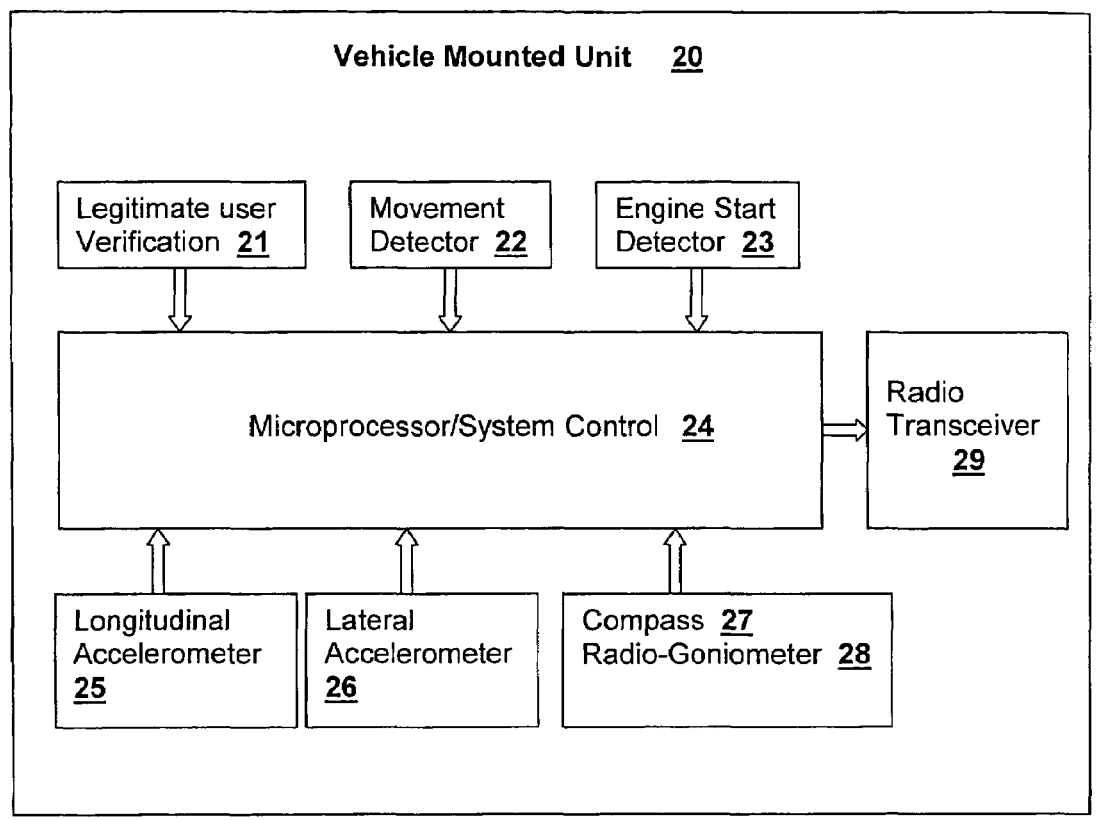
FIG. 2 is a block diagram of a vehicle mounted unit of a tracking system according a preferred embodiment of the present invention.

Referring to FIG. 2, the inertial navigational device 14 and radio transmitter 16 may preferably be integrated in a vehicle mounted unit 20 containing the following modules:
Legitimate User Verification module 21;
Vehicle Movement Detector module 22;
Engine Start Detector module 23;
Microprocessor/System Control module 24;
Longitudinal accelerometer module 25;
Lateral accelerometer module 26;
Electronic Magnetic Compass module 27; and
Radio Communications transceiver module 29.

As explained below, the unit 20 may contain a Radio-goniometer module 28 in place of the Electronic Magnetic Compass module 27.

The Legitimate User Verification module 21 provides the means to identify the user as the owner or owner authorized person, and notify the Microprocessor/system Controller 24 accordingly.

Preferably, the Legitimate User Verification may be accomplished by means of a biometrics fingerprint recognition module. However, other methods including one or the combination of the following methods may be used:
1—Pressing a button on a hand-held rolling code microtransmitter.
2—Entering numbers on a keypad.
3—Hidden switch/magnetic switch.
4—Voice recognition.
5—Other authorized user validation methods.

The Vehicle Movement Detector 22 can generate a signal and prompt the Microprocessor/system Controller 24 if the vehicle 12 is moved, pushed or towed without authorization.

The Engine Start Detector 23 can generate a signal and prompt the Microprocessor/system Controller 24 if the vehicle's engine has been started without authorization.

The Longitudinal Accelerometer 25 can sense all positive and negative accelerations along the vehicle's longitudinal axis, and will send the acquired data to the Microprocessor/System controller 24.

The Lateral Accelerometer 26 can sense all positive and negative accelerations along the vehicle's lateral axis, and will send the acquired data to the Microprocessor/System controller 24.

The Electronic Magnetic compass 27 can be used to determine the initial vehicle heading direction. Alternatively, the radio-goniometer 28 can be used to find the direction of one or more known radio transmitting sources. These sources could include a number of AM or FM stations as well as other high power known transmitters. Thus, the radio-goniometer 28 output may also be used to determine the initial vehicle heading direction.

The outputs of the Longitudinal 25 and Lateral 26 accelerometers are sent to the Microprocessor/System Controller 24 where the vehicle instant velocity is computed by integrating the positive and negative increments of the acceleration magnitudes. The Microprocessor/system Controller 24 will then integrate the instant longitudinal and lateral velocity magnitudes over a period of time to compute a vector that will represent the absolute vehicle displacement from the original location in polar coordinates.

Although not absolutely necessary for the system operation, the Microprocessor/System Controller 24 may get from time to time data from the Electronic Magnetic compass 27 or the radio-goniometer 28 to recalibrate the heading magnitude.

A Radio Transceiver 29 may used to transmit at predetermined intervals the absolute displacement vectors together with the heading data to the central monitoring station 18 using public or private radio communication channels. Even though the radio transmitter 16 described above can be used instead, it is preferable to use the radio transceiver 29 as it has the advantage of being able to receive commands from the central monitoring station 18. It should be noted that high security options may include the use of spread-spectrum communications.

Although periodic radio-goniometer readings from multiple transmitting sources alone could be used to determine vehicle position, the combination of both inertial and goniometer methods provides higher position resolution as well as enhanced security.

Power for the Vehicle Mounted unit 20 may be supplied by the vehicle's 12V battery. Alternatively, a second internal battery may be able to power the unit 20 in the event that the vehicle's battery is disconnected or the wiring is cut or tampered with.

The purpose of the Central Monitoring Station 18 is to receive navigational data sent from the Vehicle Mounted Unit 20, and using computational methods, to determine the actual location of the vehicle in question.

Data received from the Vehicle Mounted Unit 20 can be converted into meaningful latitude-longitude coordinates and/or a scrolling map display where the System Administrator may follow the vehicle displacement through actual city streets, roads and highways, in real time.

Because of the fact that the Central Monitoring Station 18 can immediately know that a particular vehicle has been stolen or that is being driven by a non-authorized person, the system administrator will be able to call the police and provide enough information that will allow the stolen vehicle to be intercepted as it is being driven away.

Upon receiving navigational data from a missing vehicle, or at a later time, the System Administrator may dispatch a Tracker/Follower vehicle (not illustrated) to an area very close to the actual location of the missing vehicle.

The Follower/Tracker Vehicle may be equipped with radio receivers and radio direction finders that can lock onto the periodic beacon signal transmitted by the Vehicle Mounted Unit 20. This will allow finding and/or following the missing vehicle until the local authorities decide upon the proper course of action to recover the vehicle in question.

In use, under normal operating conditions, the system 10 is in stand-by mode, waiting for a trigger signal to start generating vehicle displacement data. The authorized/legitimate user of the vehicle must normally disable the system before starting the vehicle's engine. The system 10 will be triggered if the vehicle's engine is started without prior disabling the system, or if the vehicle is moved, towed or pushed without authorization. This is achieved through the legitimate user verification module 21, the movement detector module 22 and the engine start detector module 23. Once the system has been triggered, it will proceed to initialize-calibrate, reset the displacement vectors, and acquire the initial vehicle heading.

Different applications may require the use of the self-contained electronic magnetic compass or the self-contained radio-goniometer for spot calibration purposes.

After initializing and calibrating, the system 10 starts transmitting a data stream containing the displacement vector from the original location, and in the case of radio-goniometer 28 equipped units, the goniometer frequency and direction data.

The central monitoring station 18 will be instantly alerted of the vehicle 12 being displaced without authorization, and will proceed to alert the vehicle's owner and local authorities.

At the same time the central station 20 may dispatch a tracking/following vehicle that will lock on the transmitted data stream beacon, and will help to determine the actual vehicle location within a few square meters. This information will be transmitted to the local authorities in order to intercept and recover the vehicle.

Figure 3:
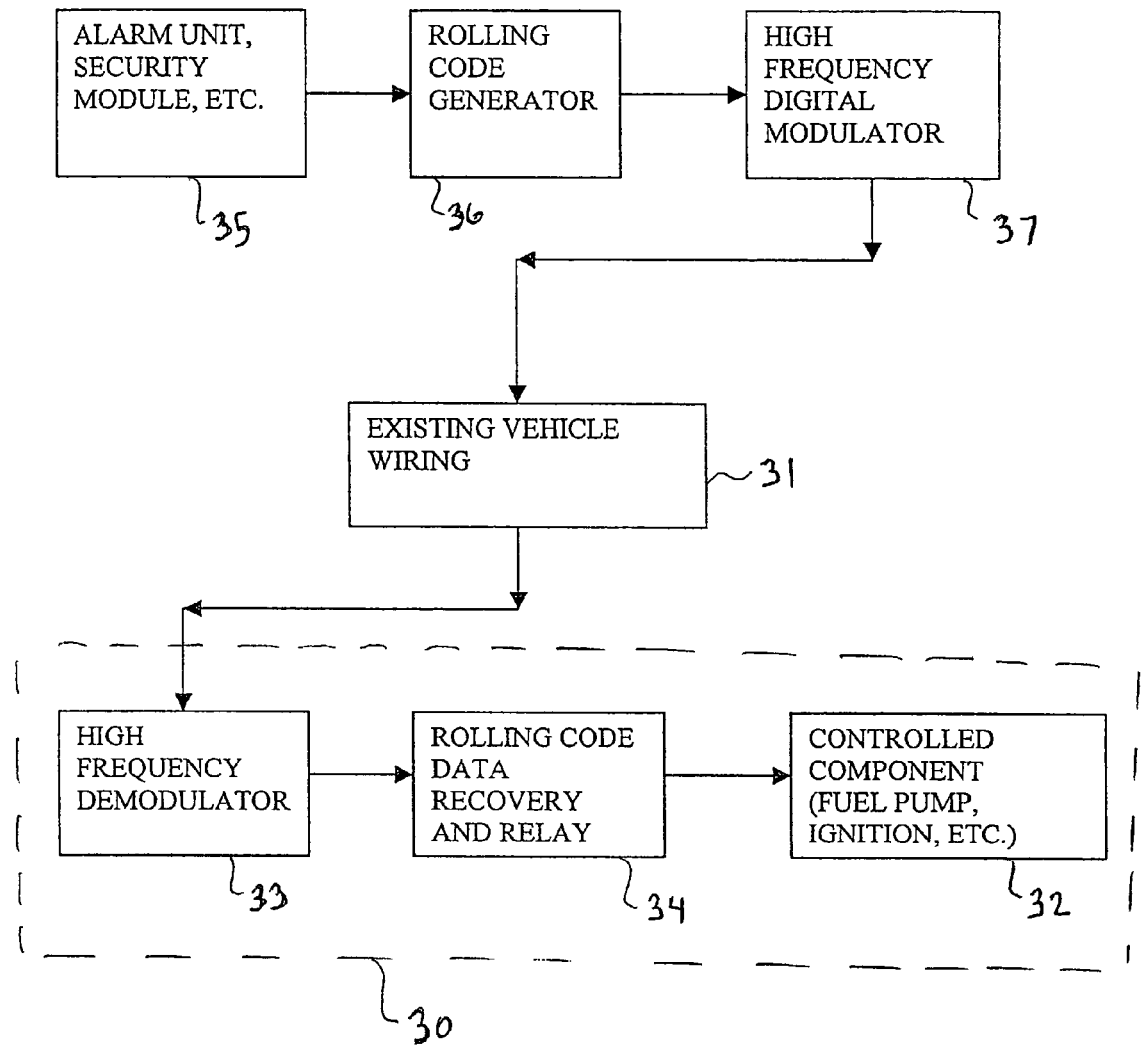
FIG. 3 is a block diagram of wireless remote cut-off modules according to a preferred embodiment of the present invention.

Referring to FIG. 3, according to yet another aspect of the present invention, there is provided a method to control remote cut-off modules 30 using a high frequency carrier superimposed to the existing vehicle wiring 31. The cut-off modules 30 are connected directly to the controlled component 32, and controlled by superimposing a high frequency carrier signal to the 12 Volt vehicle wiring.

Preferably, this carrier may have a frequency between 50 kHz and 500 kHz, and is modulated by a coded signal that is used to remotely enable or disable the cut-off module 30.

Since there is no wiring from the main control to the cut-off modules 30, it becomes very difficult to locate and disable them. The cut-off 30 modules may be easily disguised within the existing vehicle wiring harnesses.

Preferably, the control signal contains digital packets that may address each module individually, the modules answer with status and acknowledge packets using the same communications principle.

Preferably, the remote cut-off modules 30 contain a high frequency receiver/demodulator 33 that extracts the data packet from the vehicle wiring 31, a rolling code data recovery circuit and a relay 34 that is used to control, disable and enable the critical vehicle components 32.

Preferably, the control signal is sent by an alarm unit or security module 35 which uses a rolling code generator 36 and a high frequency modulator 37 before being transmitted via the existing wire of the vehicle 31.

Preferably, the modules 30 are always in the disable mode unless enabled by the main control unit. Therefore removing or destroying the main control unit will not allow the vehicle's engine to be started.

Preferably, the packets contain a progressive rolling code key to address the remote modules. This means that every time that a module is addressed, an algorithm within the control module firmware generates a new, different identification code.

This process prevents would be thieves to eavesdrop the communication between the control and remote modules, and to try to energize the modules by emulating the control signals.

The use of rolling code technology to address the remote modules therefore prevents eavesdropping and the emulation of system control packets.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A tracking system for locating a vehicle comprising:
a device mounted on the vehicle for generating a position vector used to determine an absolute vehicle location;
a radio transmitter connected to the device for transmitting the position vector; and
a central monitoring station for receiving the position vector transmitted by the radio transmitter;
wherein the device includes a microprocessor control module and the vehicle is provided with at least one cut-off module connected to and powered by existing conductor wires of the vehicle, said at least one cut-off module being adapted to disable a critical component of the vehicle to prevent engine starting by an unauthorized user, and wherein said at least one cut-off module is controlled by a high frequency carrier signal sent by the microprocessor control module and carried by the existing conductor wires of the vehicle.

2. The tracking system according to claim 1, wherein the microprocessor control module is connected to first and second micro-machined accelerometers for receiving accelerations measurements along longitudinal and lateral directions of the vehicle, and for computing the position vector.

3. The tracking system according to claim 2, wherein the microprocessor control module is connected to an electronic magnetic compass module to determine a heading direction of the vehicle.

4. The tracking system according to claim 2, wherein the microprocessor control module is connected to a radio-goniometer to determine a heading direction of the vehicle.

5. The tracking system according to claim 1, wherein the radio transmitter includes a wireless cellular network transceiver for establishing a cellular telecommunications link with the central monitoring station.

6. The tracking system according to claim 1, wherein the radio transmitter includes a wireless paging network transceiver for establishing a pager telecommunications link with the central monitoring station.

7. The tracking system according to claim 2, wherein the microprocessor control module is connected to a legitimate user verification module for determining if a user is authorized to move the vehicle by means of a validation method.

8. The tracking system according to claim 7, wherein the legitimate user verification module includes a biometrics fingerprint identification module for determining if a user is authorized to move the vehicle.

9. The tracking system according to claim 7, wherein the microprocessor control module is connected to a movement detector module for detecting unauthorized movement of the vehicle and to an engine start detector for detecting unauthorized engine starting of the vehicle.

10. The tracking system according to claim 1, wherein the carrier signal has a frequency of 50 KHz to 500 KHz modulated by a rolling code signal and wherein the at least one cut-off modules includes a high frequency receiver demodulator-for extracting data packets received from the existing conductor wires of the vehicle, and a rolling code data recovery circuit and a relay for enabling and disabling the critical vehicle components.

* * * * *